United States Patent [19]
Eto et al.

[11] Patent Number: 5,251,719
[45] Date of Patent: Oct. 12, 1993

[54] ACTIVE TORQUE-SPLIT CONTROL SYSTEM FOR ACTIVELY DISTRIBUTING DRIVING TORQUES APPLIED TO WHEELS IN FOUR-WHEEL DRIVE VEHICLES

[75] Inventors: Yoshiyuki Eto, Isehara; Akira Kiribe, Hatano; Hitoshi Tanaka, Shimotsuga; Takashi Yonezawa, Kawachi; Takayuki Watanabe, Sagamihara, all of Japan

[73] Assignee: Nissan Motor Company, Ltd., Japan

[21] Appl. No.: 817,891

[22] Filed: Jan. 9, 1992

[30] Foreign Application Priority Data

Jan. 11, 1991 [JP] Japan ................... 3-001969

[51] Int. Cl.⁵ .................................................. B60K 17/348
[52] U.S. Cl. ..................................... 180/197; 180/248; 364/426.03
[58] Field of Search ............... 180/248, 249, 197, 233; 364/424.1, 426.02, 426.03

[56] References Cited

U.S. PATENT DOCUMENTS

| | | | |
|---|---|---|---|
| 4,538,700 | 9/1985 | Suzuki | 180/248 |
| 4,754,834 | 7/1988 | Ozaki et al. | 364/424.1 X |
| 4,770,266 | 9/1988 | Yamaguchi et al. | 180/248 X |
| 4,776,424 | 10/1988 | Naito | 180/233 |
| 4,792,009 | 12/1988 | Iritani | 180/248 X |
| 4,805,721 | 2/1989 | Takahashi et al. | 180/248 |
| 4,809,807 | 3/1989 | Leiber | 180/248 X |
| 4,874,056 | 10/1989 | Naito | 180/233 |
| 4,986,388 | 1/1991 | Matsuda | 180/248 |
| 4,989,686 | 2/1991 | Miller et al. | 364/426.03 X |
| 5,002,147 | 3/1991 | Tezuka et al. | 180/248 X |
| 5,119,298 | 6/1992 | Naito | 180/248 X |
| 5,126,942 | 6/1992 | Matsuda | 364/426.02 |

FOREIGN PATENT DOCUMENTS

| | | | |
|---|---|---|---|
| 0415554 | 3/1991 | European Pat. Off. | 180/248 |
| 0415630 | 3/1991 | European Pat. Off. | 180/248 |
| 0438178 | 7/1991 | European Pat. Off. | 180/248 |
| 62-265030 | 11/1987 | Japan . | |
| 0041246 | 2/1988 | Japan | 180/248 |
| 0114021 | 4/1990 | Japan | 180/248 |
| 0090436 | 4/1991 | Japan | 180/248 |
| 2225757 | 6/1990 | United Kingdom | 180/248 |

Primary Examiner—Margaret A. Focarino
Assistant Examiner—Peter English
Attorney, Agent, or Firm—Lowe, Price, LeBlanc & Becker

[57] ABSTRACT

An active torque-split control system for actively controlling a distribution of driving torque applied to front and rear wheels in a four-wheel drive vehicle employing a transfer device including a transfer clutch for varying said driving torque distribution depending on the operating state of the vehicle, comprises sensors for monitoring the operating state, and a torque-split controller for switching from a normal torque-split control mode to a rigid torque-split control mode only when the controller determines that the vehicle is operated in a warning region closer to a critical state. The normal torque-split control mode corresponds to a first mode that the rear-wheel driving torque gets priority over the front-wheel driving torque, while the second controllable torque corresponds to a second mode that the transfer ratio of the front-wheel driving torque is quickly increased to be substantially equal to that of the rear-wheel driving torque so as to obtain a front-wheel speed substantially equal to a rear-wheel speed.

11 Claims, 5 Drawing Sheets

ACTIVE TORQUE-SPLIT CONTROL SYSTEM FOR ACTIVELY DISTRIBUTING DRIVING TORQUES APPLIED TO WHEELS IN FOUR-WHEEL DRIVE VEHICLES

BACKGROUND OF THE INVENTION

1. Field of the Invention

The present invention relates to a control system for actively distributing driving torques applied to wheels in four-wheel drive automotive vehicles, and specifically to an electronic active torque-split control system for actively controlling the driving torque distribution between front wheels and rear wheels in four-wheel drive vehicles.

2. Description of the Background Disclosure

Recently, there have been proposed and developed various four-wheel drive vehicles in which driving torque transmitted to front-wheels is variably and actively controlled by the magnitude of engaging force created by a transfer clutch disposed in a transfer device which is connected to both front and rear propeller shafts, so as to achieve torque distribution between a front-wheel driving torque and a rear-wheel driving torque. One such four-wheel drive vehicle has been disclosed in Japanese First Publication (Tokkai) Showa 62-265030. In such a conventional four-wheel drive vehicle, a driving torque transmitted to a front-wheel would be basically determined in proportion to the rotational speed difference between front and rear wheel speeds. The proportional gain required for arithmetically determining the driving torque transmitted to the front-wheel is generally derived on the basis of a lateral acceleration exerted on the vehicle body such that the proportional gain is reduced in accordance with an increase in the lateral acceleration. Such a driving torque distribution control achieved between front and rear wheels is in general referred to as an 'active torque-split control'. The previously noted conventional active torque-split control wherein a driving torque distribution is determined depending upon both a rotational speed difference between front and rear wheels and a lateral acceleration exerted on the vehicle body, can provide a superior steering characteristics and a high drivability regardless of a frictional coefficient of road surfaces, namely a low frictional road surface such as wet or icy roads and a high frictional road surface such as dry pavement, since the behaviour of the vehicle is controlled to be always maintained in a substantially neutral steer. Such a prior art active torque-split control system can provide sufficient traction and cornering force on turns.

However, in the aforementioned conventional torque-split control, the vehicle is maintained in a substantially neutral steer and a rate of driving torque distribution between front and rear wheels is gradually and moderately varied depending upon the rotational speed difference between front and rear wheels and the lateral acceleration of the vehicle body, even when the vehicle is operated in a critical state with regard to tires and suspension systems, such as high-speed driving on curves. For this reason, it is difficult for the driver to quickly and predictively feel that the vehicle is close to the critical state, during hard turns with a great lateral acceleration, for example.

SUMMARY OF THE INVENTION

It is, therefore in view of the above disadvantages, an object of the present invention to provide an active torque-split control system for actively distributing driving torques applied to front and rear wheels in four-wheel drive vehicles which can provide high predictability and predictive reliability for a critical operating state of the vehicle and a high controllability of the vehicle when the vehicle experiences the critical operating state during hard turns, such as a quick turn with a great lateral acceleration of the vehicular body.

It is another object of the invention to provide a driving torque control system being capable of providing an optimal driving torque distribution between front and rear wheels in four-wheel drive vehicles, irrespective of various road surface conditions, such as a low frictional road surface or a high frictional road surface, so as to enhance a drivability and steering stability of the vehicle.

It is a further object of the invention to provide an active torque-split control system in four-wheel drive vehicles being capable of providing a reliable driving torque distribution between front and rear wheels in order to enhance a safe performance of the vehicle.

It is a still further object of the invention to provide a driving torque control system in four-wheel drive vehicle which can prevent a steering characteristics of the vehicle from changing from a substantially neutral steer to an excessive oversteer when the vehicle is in a critical operating state.

In order to accomplish the aforementioned and other objects, an active torque-split control system for actively controlling a driving torque distribution between front and rear wheels in a four-wheel drive vehicle employing a transfer device provided for splitting torque output from a transmission into a front-wheel driving torque and a rear-wheel driving torque, comprises a transfer clutch disposed in the transfer device for varying the driving torque distribution depending on a controllable engaging force thereof, sensor means for monitoring a degree of turning of the vehicle and a slippage occurring at the vehicle wheels and for generating a corresponding signal discrimination means for discriminating on the basis of the signal from the sensor means whether the vehicle is being operated in a cornering warning region that is close to a critical state in which the vehicle will experience oversteer and control means for variably controlling the engaging force of the transfer clutch so as to switch from a first controllable front-wheel driving torque to a second controllable front-wheel driving torque only when the discrimination means determines that the vehicle is in the cornering warning region. The first controllable torque is set to maintain a performance of the vehicle substantially in neutral steer in accordance with a given first driving torque distribution derived on the basis of the signal from the sensor means, while the second controllable torque is set such that a front-wheel speed becomes substantially equal to a rear-wheel speed in accordance with a second driving torque distribution derived on the basis of said signal from said sensor means in order to shift the performance of the vehicle from oversteer to understeer within the cornering warning region, whereby a torque-split mode of the four-wheel drive vehicle is quickly shifted towards a more rigid torque-split mode according to which an engaging force of the transfer clutch is stepped up through a quick torque distribution shift from the first controllable torque to the second controllable torque, immediately upon a determination that the cornering warning region is reached.

According to another aspect of the invention, an active torque-split control system for actively controlling a driving torque distribution between front and rear wheels in a four-wheel drive vehicle employing a transfer device connected to a front propeller shaft connected through a front differential and front-wheel drive axles to the front wheels and a rear propeller shaft connected through a rear differential and rear-wheel drive axles to the rear wheels, comprises a transfer clutch disposed in the transfer device for varying the driving torque distribution in accordance with a controllable engaging force thereof, sensor means for monitoring an operating state of the vehicle so as to generate a signal representative of the operating state, discrimination means for discriminating on the basis of the signal from the sensor means whether the vehicle is operated in a warning region closer to a critical state, mode-selection means for selecting one of two torque-split control modes. One mode is a first torque-split control mode wherein a rear-wheel driving torque gets priority over a front-wheel driving torque with a given driving torque distribution derived on the basis of the signal from the sensor means, and the other mode is a second torque-split control mode wherein a front-wheel speed is substantially equal to a rear-wheel speed. The mode-selection means selects the first torque-split control mode when the discrimination means determines that the vehicle is in a non-warning region out of the warning region and the second torque-split control mode when the discrimination means determines that the vehicle is in the warning region. The active torque-split control system also includes means for variably controlling the engaging force of the transfer clutch in response to the mode selected by the mode-selection means.

According to a further aspect of the invention, an active torque-split control system for actively controlling a driving torque distribution between front and rear wheels in a four-wheel drive vehicle employing a transfer device provided for splitting torque output from a transmission into a front-wheel driving torque and a rear-wheel driving torque, comprises a transfer clutch disposed in the transfer device for varying the driving torque distribution depending on a controllable engaging force thereof, sensor means for monitoring an operating state of the vehicle so as to generate a signal representative of the operating state, discrimination means for discriminating on the basis of the signal from the sensor means whether the vehicle is operated in a warning region closer to a critical state, a first torque arithmetic means for deriving a first controllable front-wheel driving torque such that the rear-wheel driving torque gets priority over the front-wheel driving torque with a given driving torque distribution derived on the basis of the signal from the sensor means, so as to permit the vehicle to be kept in a substantially neutral steer on turns, a second torque arithmetic means for deriving a second controllable front-wheel driving torque such that a front-wheel speed becomes substantially equal to a rear-wheel speed, so as to permit a steering characteristics of the vehicle during turns to change from a substantially neutral steer to understeer, and control means for variably controlling the engaging force of the transfer clutch so as to switch from the first controllable front-wheel driving torque to the second controllable front-wheel driving torque only when the discrimination means determines that the vehicle is in the warning region.

The active torque-split control system comprises means for monitoring a road friction indicative factor for producing a road friction data. The given driving torque distribution is determined such that the first controllable torque is reduced in accordance with an increase in the road friction data when compared with the rear-wheel driving torque. The sensor means includes a first means for monitoring a degree of turning of the vehicle and a second means for monitoring a slippage of the wheels. The first means may be comprised of a longitudinal acceleration sensor and a lateral acceleration sensor respectively detecting a longitudinal acceleration and a lateral acceleration, exerted on the vehicular body. The second means may be comprised of front and rear wheel-speed sensors for monitoring a front-wheel speed and a rear-wheel speed. The discrimination means affirms the warning region of the vehicle when the degree of turning exceeds a threshold level and the slippage exceeds a preset threshold value. The slippage may be determined on the basis of a wheel speed difference between the front-wheel speed and the rear-wheel speed. The second controllable torque is generally set to a greater value than the first controllable torque irrespective of the magnitude of the lateral acceleration. The first controllable torque may be determined on the basis of a product of the wheel speed difference and a controllable gain being substantially in inverse proportion to the lateral acceleration. The road friction indicative factor monitoring means may comprise the lateral acceleration sensor.

In a four-wheel drive vehicle employing an anti-skid brake control system, the sensor means may include a third means in addition to the first and second means, for detecting whether the anti-skid brake control system is activated. The discrimination means affirms the warning region of the vehicle when the degree of turning exceeds a threshold level, the slippage exceeds a preset threshold value, and the anti-skid brake control system is deactivated. The control means may include a pressure control valve for variably controlling the engaging force via working fluid pressure.

DESCRIPTION OF THE PREFERRED EMBODIMENTS

Figure 1:
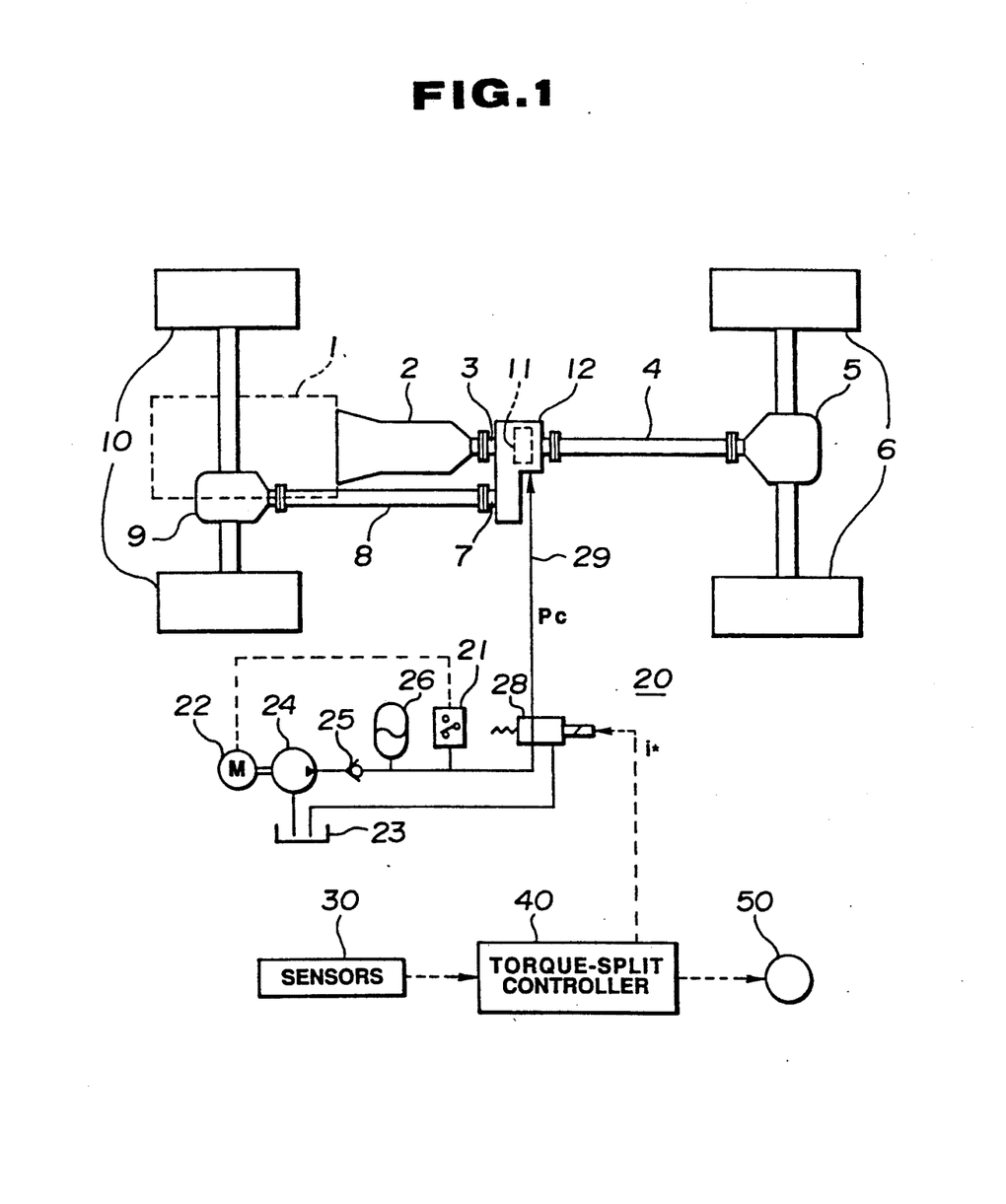
FIG. 1 is a schematic system diagram illustrating one embodiment of an active torque-split control system or a driving force distribution control system applied for a four-wheel drive vehicle according to the invention.

Referring now to the drawings, particularly to FIG. 1, there is shown a four-wheel drive system applied for a front-engine four-wheel drive vehicle which system is drivingly controlled by a torque split controller according to the present invention, as described hereinbelow in detail. As is generally known, the four-wheel drive system includes an engine 1, a transmission 2, a transfer input shaft 3, a rear propeller shaft 4, a rear differential 5 being connected through rear-wheel drive axles to rear wheels 6, a transfer output shaft 7, a front propeller shaft 8, a front differential 9 being connected through front-wheel drive axles to front wheels 10. The rear propeller shaft 4 and the rear differential 5 are included in a rear-wheel drive system, while the transfer output shaft 7, the front propeller shaft 8 and the front differential 9 are included in a front-wheel drive system. The engine 1, the transmission 2, and the transfer input shaft 3 are respectively included in both the front and rear wheel drive systems. As clearly shown in FIG. 1, the transfer input shaft 3 is connected to the output shaft of the transmission 2 and also connected through a transfer device 12 to both the rear propeller shaft 4 and the front propeller shaft 8, so as to distribute the engine output torque into the front and rear wheels. The front and rear propeller shafts 8 and 4 are respectively connected to the front and rear differentials 9 and 5. Although it is not clearly shown, the transfer device 12 in general comprises a transfer case, a center differential gear, and a transfer clutch 11, such as a wet multiple disc friction clutch, serving as a torque distribution clutch.

In order to satisfy a superior controllability of the vehicle and to enhance a driving performance, such as traction and cornering force, an active torque-split control system according to the invention also includes a working fluid pressure control unit 20 employing a fluid pressure control valve 28 and a torque split controller 40 outputting a controllable dither current i* to the pressure control valve 28. The magnitude of the engaging force of the clutch 11 is determined by a controllable fluid pressure Pc generated from the control unit 20. The magnitude of dither current i* is derived on the basis of an input information generated from various sensors 30, such as wheel-speed sensors monitoring each vehicle wheel-speed, a lateral acceleration sensor monitoring a lateral acceleration exerted on the vehicle body, and a longitudinal acceleration sensor monitoring a longitudinal acceleration exerted on the vehicle body.

The fluid pressure control unit 20 is comprises of a prime mover 22, such as an electric motor 22 activated or deactivated by means of a relief switch 21, an oil pump 24 having a driven connection with the motor 22 so as to pressurize working fluid in an oil reservoir 23, an accumulator 26 for accumulating pressurized working fluid fed from the oil pump 24 through a check valve 25 thereto so as to regulate a primary fluid pressure created by the oil pump 24 as a secondary fluid pressure corresponding to a stable line pressure, and a fluid pressure control valve 28, such as an electromagnetic solenoid valve. The fluid pressure control valve 28 generates the control fluid pressure Pc based on the magnitude of the dither current i* created by the torque split controller 40. The control fluid pressure Pc is supplied through a fluid line 29 to the input port of the transfer clutch 11 so as to variably control the engaging force of the clutch 11.

Figure 2:
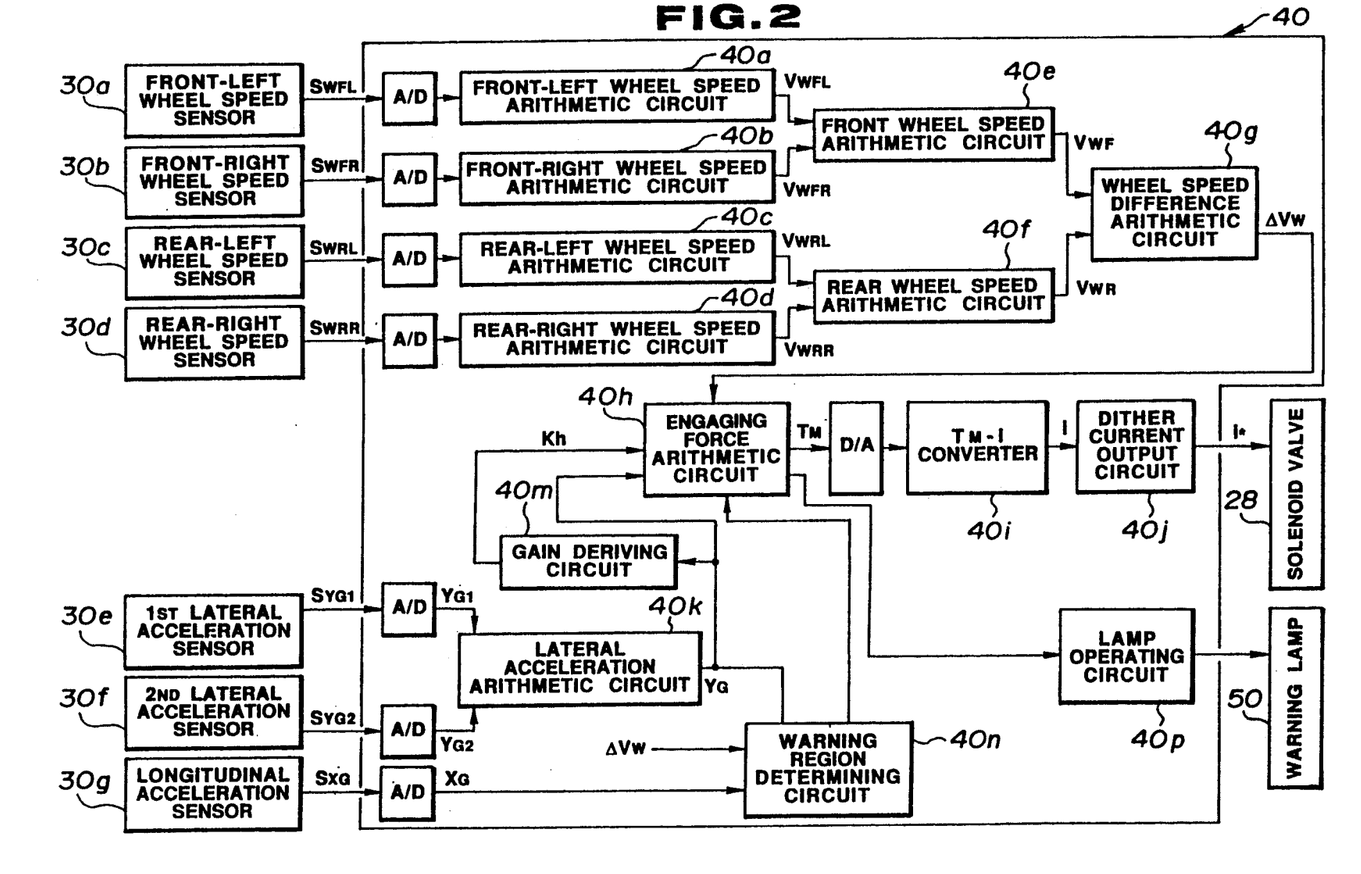
FIG. 2 is a block diagram illustrating an electronic torque split controller employed in the active torque-split control system of the first embodiment of FIG. 1.

As seen in FIG. 2, in the embodiment, the torque split controller 40 is connected to a front-left wheel speed sensor 30a generating a front-left wheel speed indicative signal $S_{WFL}$, a front-right wheel speed sensor 30b generating a front-right wheel speed indicative signal $S_{WFR}$, a rear-left wheel speed sensor 30c generating a rear-left wheel speed indicative signal $S_{WRL}$, a rear-right wheel speed sensor 30d generating a rear-right wheel speed indicative signal $S_{WRR}$, two lateral acceleration sensors 30e and 30f respectively generating a first lateral acceleration indicative signal $S_{YG1}$ and a second lateral acceleration indicative signal $S_{YG2}$, and a longitudinal acceleration sensor 30g generating a longitudinal acceleration indicative signal $S_{XG}$.

The torque split controller includes four wheel speed arithmetic circuits 40a, 40b, 40c and 40d each of which is connected through an analogue to digital converter A/D to the corresponding wheel speed sensor, a front-wheel speed arithmetic circuit 40e provided for deriving a mean value $V_{WF}$ between the front-left and front-right wheel speeds, a rear-wheel speed arithmetic circuit 40f provided for deriving a mean value $V_{WR}$ between the rear-left and rear-right wheel speeds, and a wheel speed difference arithmetic circuit 40g for deriving the wheel speed difference $\Delta V_W$ between the front and rear wheel speeds $V_{WF}$ and $V_{WR}$. The torque split controller 40 includes a clutch engaging force arithmetic circuit 40h generating a finally determined, calculated torque value $T_M$ so as to determine the engaging force of the clutch 11, a torque to current converter 40i ($T_M - i$ converter) connected through a digital to analogue converter D/A to the engaging force arithmetic circuit 40h to convert the final torque value $T_M$ to a current value i, a dither current output circuit 40j connected to $T_M - i$ converter so as to output the dither current i* to the solenoid valve 28, a lateral acceleration arithmetic circuit 40k connected through analogue to digital converters A/D to both lateral acceleration sensors 30e and 30f to generate a mean value $Y_G$ between both converter lateral acceleration values $Y_{G1}$ and $Y_{G2}$, and a gain deriving circuit 40m from which a controllable gain Kh is output to the engaging force arithmetic circuit 40h. The torque split controller 40 also includes a warning region determining circuit 40n connected to the wheel speed difference arithmetic circuit 40g and through an analogue to digital converter A/D to the longitudinal acceleration sensor 30g in such a manner as to receive the wheel speed difference indicative signal $\Delta V_W$ and the longitudinal acceleration indicative signal $X_G$, and a lamp operating circuit 40p connected to the engaging force arithmetic circuit 40h so as to activate or deactivate a warning lamp 50 is response to a control command from the circuit 40h. The operation of the torque split controller 40 will be hereinafter described in detail in accordance with the flow chart of FIG. 3

Figure 3:
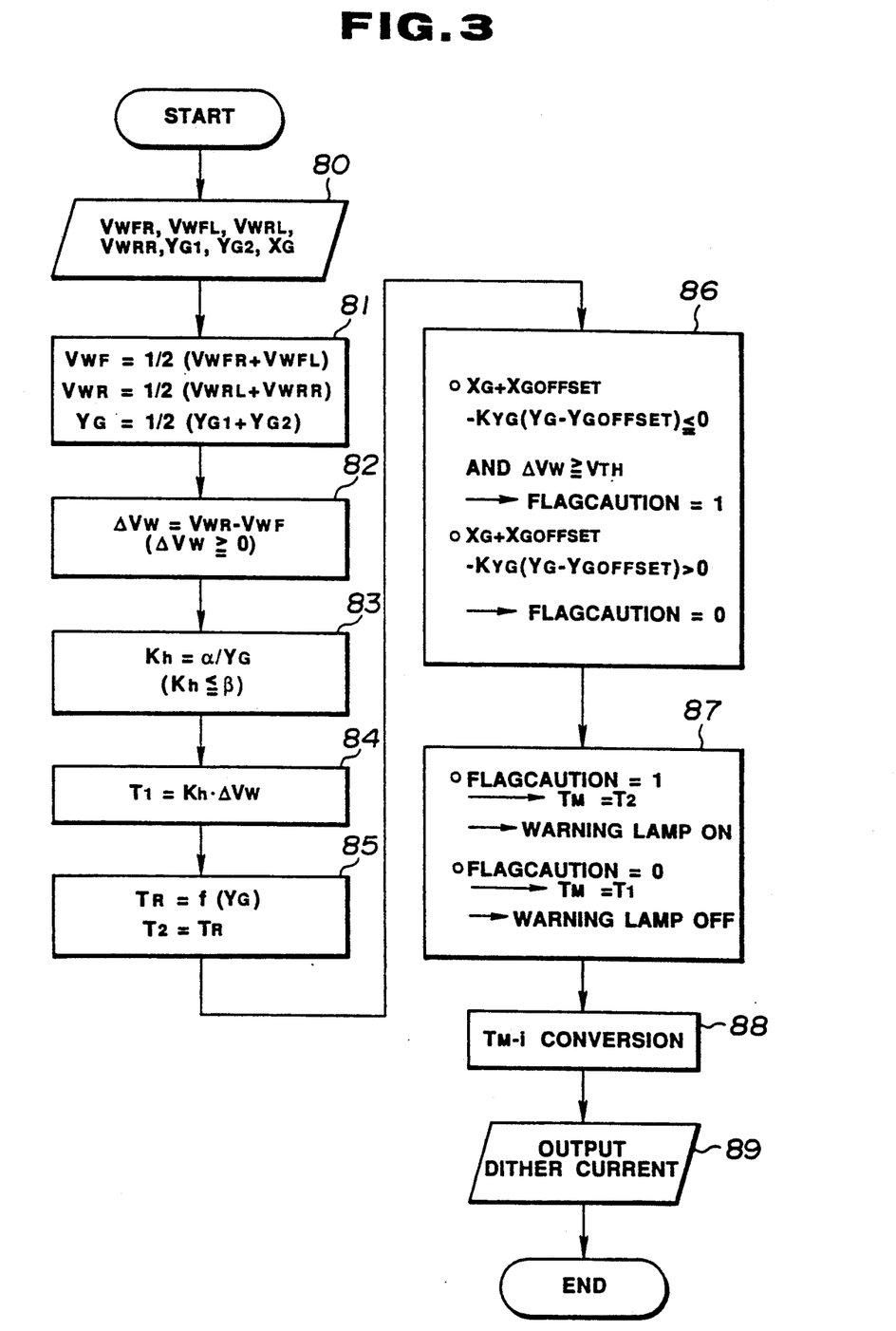
FIG. 3 is a flow chart illustrating a control procedure executed by the torque split controller of FIG. 1.

FIG. 3 shows a torque distribution control routine executed by the torque split controller 40 of the first embodiment, at a preset time interval of 10 msec.

In step 80, the controller 40 receives the plural input signals $V_{WFL}$, $V_{WFR}$, $V_{WRL}$, $V_{WRR}$, $Y_{G1}$, $Y_{G2}$ and $X_G$.

In step 81, the front-wheel speed $V_{WF}$ is derived on the basis of the wheel speeds $V_{WFL}$ and $V_{WFR}$ by means of the front wheel speed arithmetic circuit 40e and the rear-wheel speed $V_{WR}$ is derived on the basis of the wheel speeds $V_{WRL}$ and $V_{WRR}$ by means of the rear wheel speed arithmetic circuit 40f, and the lateral acceleration $Y_G$ is derived on the basis of the the lateral accelerations $Y_{G1}$ and $Y_{G2}$ by means of the lateral acceleration arithmetic circuit 40k.

In step 82, the wheel speed difference $\Delta V_w$ is calculated in accordance with an equation $\Delta V_W = V_{WR} - V_{WF}$, wherein the value $\Delta V_W$ is greater than 0, because the rear-wheel driving torque is normally set to be greater than the front-wheel driving torque in the four wheel drive system.

Figure 4:
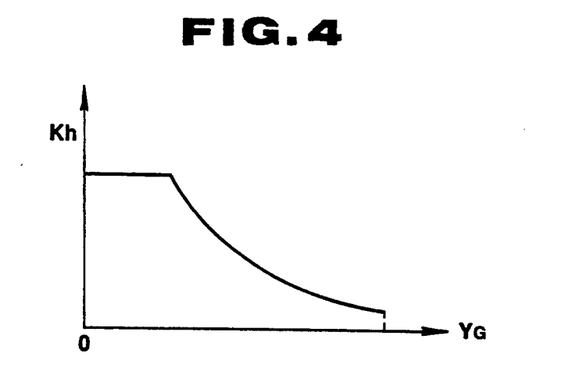
FIG. 4 is a graph illustrating a controllable gain characteristics for a controllable driving torque transmitted to front-wheels of the vehicle according to the torque-split control of the embodiment of FIG. 1, with regard to a lateral acceleration exerted on the vehicular body.

In a step 83, the controllable gain Kh is derived on the basis of a predetermined formula $Kh = \alpha/Y_G$, wherein $Kh \leq \alpha$ and $\alpha$ and $\beta$ are constant. As shown in FIG. 4, the controllable gain Kh is determined in accordance with a preset controllable gain characteristic curve stored in the gain deriving circuit 40m connected to the lateral acceleration arithmetic circuit 40k. For example, FIG. 4 shows a particular gain characteristic curve obtained by setting $\alpha$ and $\beta$ to 1 and 10, respectively. Optimal constant values $\alpha$ and $\beta$ are experimentally selected such that the four-wheel drive vehicle is always maintained in a substantially neutral steer even when the car is traveling on various road conditions, such as wet or icy roads and dry pavement.

Figure 5:
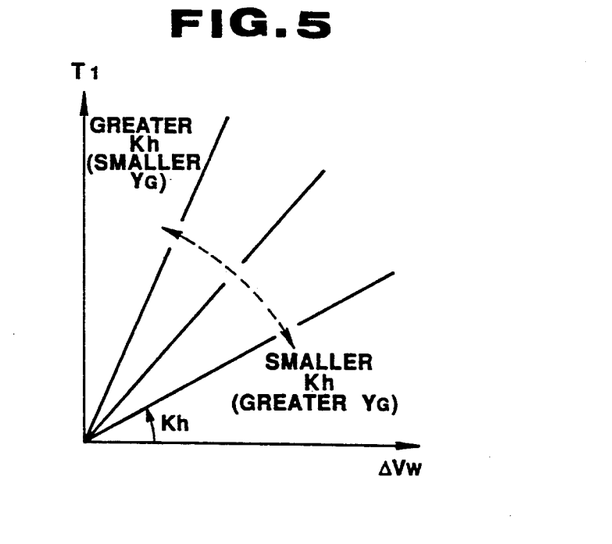
FIG. 5 is a graph illustrating a relationship between the controllable gain, the rotational speed difference between front and rear wheel speeds, and the controllable driving torque transmitted to the front-wheels.

In step 84, a first controllable driving torque $T_1$ for front-wheels is derived in accordance with a formula $T_1 = Kh(\Delta V_W)$ based on both the gain Kh determined at step 83 and the rotational wheel-speed difference $\Delta V_W$ generated by the wheel speed difference arithmetic circuit 40g. The first controllable torque $T_1$ is determined in accordance with a preset data map stored in the engraving force arithmetic circuit 40h. The torque $T_1$ may be linearly varied in accordance with the data map as exemplified in FIG. 5. In order to insure a substantially neutral steer of the vehicle, the first controllable torque $T_1$ for front wheels is normally set such that the rear-wheel driving torque gets priority over the first controllable torque, i.e., the front-wheel driving torque. The above mentioned torque-split control mode wherein the rear-wheel driving torque is set to get priority over the front-wheel driving torque, will hereinafter referred to as a 'normal torque-split control mode'.

Figure 6:
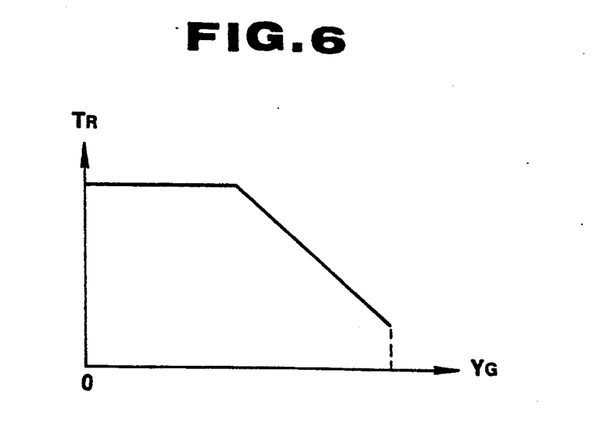
FIG. 6 is a graph illustrating a rigid torque transmitted to the front-wheels, with regard to the lateral acceleration of the vehicular body.

In step 85, a second controllable torque $T_2$ is derived such that the front-wheel speed becomes substantially equivalent to the rear-wheel speed. The second controllable torque $T_2$ as well as the first controllable torque $T_1$ is also determined depending on the lateral acceleration $Y_G$. However, the second controllable torque $T_2$ is determined in accordance with another torque characteristic curve stored in the controller 40. The torque $T_2$ may be varied in accordance with the torque characteristic curve as exemplified in FIG. 6. That is, the second controllable torque $T_2$ is selected to permit the transfer ratio of the front-wheel driving torque to rapidly be increased, with the result that the engaging force of the transfer clutch 11 is rapidly increased and consequently the center differential of the transfer device 12 is retained in a substantially rigid state. In other words, when the front-wheel driving torque is shifted from the first controllable torque $T_1$ to the second controllable torque $T_2$, the transfer ratio of the front-wheel driving torque becomes substantially equal to that of the rear-wheel driving torque. The second controllable torque $T_2$ will be hereinbelow referred to as a 'rigid torque $T_R$'. The aforementioned torque-split control mode wherein the front-wheel driving torque is substantially equal to the rear-wheel driving torque will be hereinafter referred to as a 'rigid torque-split control mode'. As appreciated from the rigid torque characteristic curve of FIG. 6, the rigid torque $T_R$ is kept at a substantially constant, high level in a low lateral acceleration range and is gradually decreased in accordance with the magnitude of the lateral acceleration in a high lateral acceleration range. The rigid torque $T_R$ is varied as shown in FIG. 6, for the reason that, in order to maintain a substantially rigid state of the center differential gear by replacing the first controllable torque $T_1$ with the second controllable torque $T_2$, i.e., the rigid torque $T_R$, a constant, high level of rigid torque $T_R$ is required to quickly reduce a relatively great wheel-speed difference $\Delta V_W$ created when the vehicle turns in close proximity to a critical operating state on a low frictional road surface, such as wet roads and when the four-wheel drive arrangement is operated in the normal torque-split control mode. As is generally known, the above mentioned great wheel-speed difference is created by a rapid increase in the rear-wheel speed, occurring due to unsufficient gripping of the rear-wheel tires on low frictional roads when the vehicle is operated in the normal torque-split control mode wherein the rear-wheel driving torque gets priority over the front-wheel driving torque. Under this condition, the slippage occurring at the rear wheels is greater than that at the front wheels. As a result, the rear-wheels could throw the entire car into a rear-end skid. This could result in oversteer and/or spinning on wet or icy roads.

Conversely, when the vehicle turns in close proximity to a critical operating state on a high frictional road surface, such as dry pavement and when the four-wheel drive arrangement is operated in the normal torque-split control mode, the wheel-speed difference is small, because both of the front and rear wheel tires grip sufficiently on the high frictional roads and both great cornering force and great traction are created at front and rear wheels so that the vehicle can turn with a greater lateral acceleration exerted thereon. Under this condition, the slippage of the vehicle wheels is small. Therefore, a value of the rigid torque $T_R$ can be set at a relatively low level as illustrated in the right-half of FIG. 6, so as to obtain the front-wheel speed substantially equal to the rear-wheel speed when the vehicle turns with a greater lateral acceleration.

In step 86, a test is made to judge and to determine whether the operating state of the vehicle is in a warning region close to a critical state. The warning region corresponds to such an operating state that the vehicle can experience a great slippage of wheels on turns. Therefore, the aforementioned judgement is made on the basis of three control parameters, namely the lateral acceleration $Y_G$, the longitudinal acceleration $X_G$, and the wheel speed difference $\Delta V_W$, as follows:

Since the condition of the vehicle turning corresponds to an operating state wherein the longitudinal acceleration $X_G$ is small and the lateral acceleration $Y_G$ is great, the vehicle turning state is determined in accordance with the following inequality.

$$X_G + X_{GOFFSET} - K_{YG}(Y_G - Y_{GOFFSET}) \leq 0$$

wherein, $X_{GOFFSET}$, $Y_{GOFFSET}$, and $K_{YG}$ are constant. On the other hand, the condition of great slippage of wheels corresponds to such an operating state that the wheel speed difference $\Delta V_W$ exceeds a predetermined threshold value $V_{TH}$ as indicated in the following inequality.

$$\Delta V_W \geq V_{TH}$$

The controller 40 positively determines that the vehicle is in the warning region when the previously noted two conditions are simultaneously satisfied. If the answer at step 86 is affirmative, a flag FLAGCAUTION stored in the controller is set to '1'.

At this time, if the operating state of the vehicle is varied from a turning state to a straight-ahead driving state, the above two conditions are not simultaneously satisfied. During the straight-ahead driving state of the vehicle, since the longitudinal acceleration $X_G$ becomes greater and the lateral acceleration $Y_G$ becomes smaller, the function $\{X_G+X_{GOFFSET}-K_{YG}(Y_G-Y_{GOFFSET})\}$ of the two accelerations $X_G$ and $Y_G$ is illustrated in the following inequality.

$$X_G+X_{GOFFSET}-K_{YG}(Y_G-Y_{GOFFSET})>0$$

The above inequality means that the operating state of the vehicle returns from the warning region to a non-warning region in which the vehicle is out of the critical state. At this time, the flag FLAGCAUTION is initialized again from '1' to '0'.

In step 87, if the flag FLAGCAUTION is set to '1' at step 86, the finally determined torque value $T_M$ is set to the second controllable torque $T_2$, i.e., the rigid torque $T_R$ and the warning lamp 50 is activated such that the driver is alarmed that the vehicle is in close proximity to the critical state. While the flag is set to '0' through the procedure of step 86, the first controllable torque $T_1$ is selected as the final torque value $T_M$ and the warning lamp 50 is kept OFF.

In step 88, the final torque value $T_M$ determined at step 87 is converted to a current value i in accordance with a preset characteristic curve stored in the controller 40 for converting the final torque value $T_M$ to the current value i.

In step 89, the current value i is converted to a dither current i* having a predetermined frequency, magnitude and permissible error, for example i±0.1 A, 100 Hz. The dither current i* is output from the circuit 40j to the solenoid valve 28 and as a result the engaging force of the clutch 11 is suitably adjusted in response to the control pressure Pc determined on the basis of the dither current i*.

The four-wheel drive vehicle is actually operated in accordance with the controller 40 of the first embodiment, as follows.

When the vehicle is travelling in the non-warning region, for instance the vehicle turns at a constant speed, both accelerations $X_G$ and $Y_G$ are small. Therefore, the function $\{X_G+X_{GOFFSET}-K_{YG}(Y_G-Y_{GOFFSET})\}$ exceeds 0, with the result that the flag FLAGCAUTION is set to '0' at step 86 and the first controllable torque $T_1$ based on the input information, such as the lateral acceleration $Y_G$ and the wheel speed difference $\Delta V_W$, is selected as a front-wheel driving torque at step 87. The engaging force of the clutch 11 is controlled through steps 88 and 89, depending on the value of first controllable torque $T_1$. In this manner, when the operating state of the vehicle is in the non-warning region, the four-wheel drive system is operated in the normal torque-split control mode by the controller 40 according to the invention. That is, in the non-warning region, the driving torque distribution between front and rear wheels is controlled in response to the driving wheel slippage based on the wheel speed difference $\Delta V_W$ and the magnitude of the lateral acceleration such that the vehicle is maintained in the substantially neutral steer under various road conditions, such as wet or icy roads and dry pavement.

When the vehicle is travelling in the warning region, for instance the vehicle turns with a great lateral acceleration, the function $\{X_G+X_{GOFFSET}-K_{YG}(Y_G-Y_{GOFFSET})\}$ becomes less than 0, with the result that the flag FLAGCAUTION is set to '1' at step 86 and the rigid torque $T_R$ is selected as a front-wheel driving torque at step 87. The engaging force of the clutch 11 is quickly increased through steps 88 and 89, depending on the value of the rigid torque $T_R$. In this manner, when the operating state of the vehicle is in the warning region, the four-wheel drive system is operated in the previously described rigid torque-split control mode by the controller 40. In other words, in the warning region, the driving torque distribution between front and rear wheels is rapidly varied such that the front-wheel speed quickly becomes equal to the rear-wheel speed, that is, the transfer ratio of the front-wheel quickly approaches to that of the rear-wheel. By such a rapid increase in the transfer ratio of the front-wheel and the energized warning lamp 50, the driver is precisely and quickly alarmed that the vehicle is in the warning state closer to the critical operating state. Furthermore, the driver can precisely recognize through visual observation of the energized warning lamp 50 that the vehicle is in the warning state. Such a high predictability in the critical state results in a natural return of the accelerator. Therefore, the operating state of the vehicle is smoothly and reliably shifted from the warning region to the non-warning region. In addition to a high predictability and predictive reliability in the critical state, a superior controllability may be obtained in accordance with an active torque-split control of the controller 40 of the embodiment. That is to say, when the torque-split control mode is changed from the normal torque-split control mode to the rigid torque-split control mode in a substantially critical operating state of the vehicle during a hard turn, the vehicle does not experience oversteer but understeer, because the driving torque distribution is quickly varied such that the front-wheel driving torque is substantially equal to the rear-wheel driving torque. Such enhanced controllability in the critical state may result in easy handling.

As will be appreciated from the above, since the judgement with regard to the operating state of the vehicle is made on the based on the three control parameters, two accelerations $X_G$, $Y_G$, and a rotational wheel speed difference $\Delta V_W$ between front and rear wheels, the controller can judge or determine with a high accuracy whether the vehicle is in the warning region closer to a critical operating state. Moreover, as described in step 86, since the mode-shift from the rigid torque-split control mode to the normal torque-split control mode is achieved by satisfying only one condition defined by the inequality $X_G+X_{GOFFSET}-K_{YG}(Y_G-Y_{GOFFSET})>0$, the mode-shift may be quickly executed with a high step-response.

Figure 7:
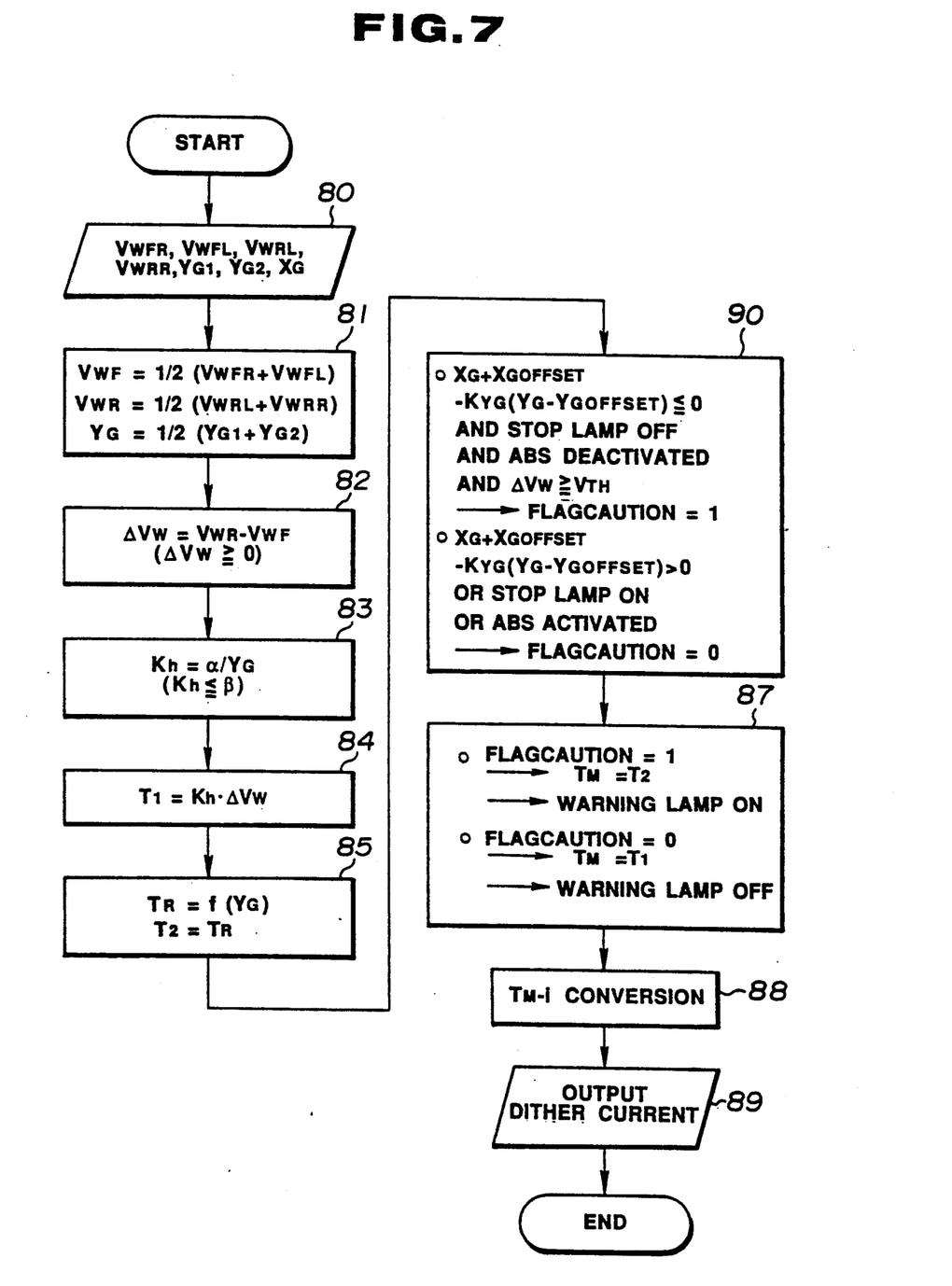
FIG. 7 is a flow chart illustrating a control procedure executed by a torque split controller of a second embodiment according to the invention.

FIG. 7 shows a control procedure executed by the torque-split controller of the second embodiment of the invention. The second embodiment is different from the first embodiment of FIG. 3 in that the previously noted torque-split control can be reliably and precisely applied for a four-wheel drive vehicle employing an anti-skid brake control system being usually abbreviated to 'ABS'. As is well known, the ABS is provided to control brake fluid pressures in wheel-cylinders independently of each other so as to prevent wheel lock. For this reason, when the ABS is activated, the fluctuations in wheel speeds occur. To avoid malfunction of the torque-split controller due to the wheel speed fluctuation created due to activation of the ABS, step 86 illustrated in FIG. 3 is replaced with step 90 illustrated in FIG. 7. As clearly shown in step 90 of FIG. 7, in addition to the two conditions indicated in step 86 of FIG. 3, newly added are two conditions, one being a third condition wherein a stop lamp is in an OFF state, the other being a fourth condition wherein the ABS is deactivated. In step 90, the flag FLAGCAUTION is set to '1' only when the vehicle operating state simultaneously satisfies the four conditions in which $X_G + X_{GOFFSET} - K_{YG}(Y_G - Y_{GOFFSET}) \leq 0, \Delta V_W \geq V_{TH}$, the stop lamp is OFF, and the ABS is deactivated. The mode-shift from the rigid torque-split control mode corresponding to the flag '1' to the normal torque-split control mode is achieved when the operating state of the vehicle satisfies at least one of the three conditions, namely $X_G + X_{GOFFSET} - K_{YG}(Y_G - Y_{GOFFSET}) > 0$, the stop lamp OFF state, and the deactivated ABS. As set forth above, the torque-split controller of the second embodiment can reliably prevent its malfunction created by activation of the ABS. Furthermore, in the second embodiment, since the deactivation of a brake system is determined at step 90 on the basis of the above noted two conditions, namely the OFF state of the stop lamp 50 and the deactivation of the ABS, the active torque-split control system according to the invention may provide a reliable fail-safe for the torque-split controller regardless of failure of the stop lamp. Particularly, it may be advantageous to utilize the torque-split control system according to the invention for such a sporty car as entered into a rally in which the car is continuously operated in close proximity to the critical state.

Although two lateral acceleration sensors are utilized to monitor a lateral acceleration exerted on the vehicular body with a high accuracy, only one lateral acceleration sensor may be mounted on the vehicle body.

In the preferred embodiments, although a road surface condition is monitored by a lateral acceleration sensor for detecting a road friction indicative factor for producing a road friction data, any other detector may be utilized for monitoring said road surface condition.

While the foregoing is a description of the preferred embodiments for carrying out the invention, it will be understood that the invention is not limited to the particular embodiments shown and described herein, but that various changes and modifications may be made without departing from the scope or spirit of this invention as defined by the following claims.

What is claimed is:

1. An active torque-split control system for actively controlling a driving torque distribution between front and rear wheels in a four-wheel drive vehicle employing a transfer device provided for splitting torque output from a transmission into a front-wheel driving torque and a rear-wheel driving torque, comprising:

a transfer clutch in said transfer device for varying said driving torque distribution depending on a controllable engaging force thereof;

sensor means for monitoring a degree of turning of the vehicle and a slippage occurring at the vehicle wheels and for generating a corresponding signal;

discrimination means for discriminating on the basis of said signal from said sensor means whether said vehicle is being operated in a cornering warning region that is close to a critical state in which the vehicle will experience oversteer; and control means for variably controlling said engaging force of said transfer clutch so as to switch from a first controllable front-wheel driving torque to a second controllable front-wheel driving torque only when said discrimination means determines that said vehicle is in said cornering warning region, said first controllable torque being set to maintain a performance of the vehicle substantially in neutral steer in accordance with a given first driving torque distribution derived on the basis of said signal from said sensor means, and said second controllable torque being set such that a front-wheel speed becomes substantially equal to a rear-wheel speed in accordance with a second driving torque distribution derived on the basis of said signal from said sensor means in order to shift the performance of the vehicle from oversteer to understeer within said cornering warning region, whereby a torque-split mode of the four-wheel drive vehicle is quickly shifted towards a more rigid torque-split mode according to which an engaging force of said transfer clutch is stepped up through a quick torque distribution shift from said first controllable torque to said second controllable torque, immediately upon a determination that said cornering warning region is reached.

2. The active torque-split control system as set forth in claim 1, further comprising:

means for monitoring a road friction indicative factor for producing corresponding road friction data, said control means cooperating with said monitoring means for deriving said given first driving torque distribution such that said first controllable torque is reduced in accordance with an increase in said road friction data when compared with said rear-wheel driving torque.

3. The active torque-split control system as set forth in claim 2, wherein:

said road friction indicative factor monitoring means comprises a lateral acceleration sensor.

4. The active torque-split control system as set forth in claim 1, wherein:

said sensor means comprises a longitudinal acceleration sensor and a lateral acceleration sensor, respectively detecting a longitudinal acceleration and a lateral acceleration exerted on the vehicular body, and front and rear wheel-speed sensors for monitoring a front-wheel speed and a rear-wheel speed respectively.

5. The active torque-split control system as set forth in claim 4, wherein:

said discrimination means affirms said cornering warning region of said vehicle when said degree of turning exceeds a threshold level and said slippage exceeds a preset threshold value, and said slippage is determined on the basis of a wheel speed difference between said front-wheel speed and said rear-wheel speed.

6. The active torque-split control system as set forth in claim 4, wherein:

said first controllable torque is determined on the basis of a product of said wheel speed difference and a controllable gain which is substantially in inverse proportion to said lateral acceleration.

7. The active torque-split control system as set forth in claim 5, wherein:
said discrimination means determines whether said turning degree of the vehicle exceeds the threshold level by an inequality $X_G + X_{GOFFSET} - K_{YG}(Y_G - Y_{GOFFSET}) \leq 0$, where $X_G$ is a value of the detected longitudinal acceleration, $Y_G$ is a value of the detected lateral acceleration, and $X_{GOFFSET}$, $K_{YG}$, and $Y_{GOFFSET}$ are predetermined constants.

8. The active torque-split control system as set forth in claim 4, wherein:
said second controllable torque is set to a greater value than said first controllable torque irrespective of the magnitude of said lateral acceleration.

9. The active torque-split control system as set forth in claim 1, wherein said control means includes a pressure control valve for variably controlling said engaging force via working fluid pressure.

10. The active torque-split control system as set forth in claim 1, wherein:
said second controllable torque is variably controlled depending on said turning degree of the vehicle.

11. An active torque-split control system for actively controlling a driving torque distribution between front and rear wheels in a four-wheel drive vehicle employing an anti-skid brake control system and a transfer device provided for splitting torque output from a transmission into a front-wheel driving torque and a rear-wheel driving torque, comprising:
a transfer clutch disposed in said transfer device for varying said driving torque distribution depending on a controllable engaging force thereof;
sensor means for monitoring a degree of turning of the vehicle and a slippage occurring at the vehicle wheels, to generate a signal representative thereof, said sensor means includes means for detecting whether said anti-skid brake control system is activated or deactivated and means for detecting whether brakes are applied to the wheels;
discrimination means for discriminating on the basis of said signal from said sensor means, whether said vehicle is in a cornering warning region that is close to a critical state in which the vehicle experiences oversteer; and
control means for variably controlling said engaging force of said transfer clutch so as to switch from a first controllable front-wheel driving torque to a second controllable front-wheel driving torque only when said discrimination means determines that said vehicle is in said cornering warning region under a particular condition wherein said anti-skid brake control system is deactivated in the absence of application of the brakes, said first controllable torque being set such that said rear-wheel driving torque is greater than said front-wheel driving torque in accordance with a given first driving torque distribution derived on the basis of said signal from said sensor means in order to maintain the behavior of the vehicle in substantially neutral steer, and said second controllable torque being set such that a front-wheel speed becomes substantially equal to a rear-wheel speed, in accordance with a given second driving torque distribution derived on the basis of said signal from said sensor means in order to shift the behavior of the vehicle from oversteer to understeer within said cornering warning region, whereby a torque-split mode of the four-wheel drive vehicle is quickly shifted towards a more rigid torque-split mode according to which the engaging force of said transfer clutch is stepped up through a quick torque distribution shift from said first controllable torque to said second controllable torque, immediately upon a determination that said cornering warning region is reached.

* * * * *